United States Patent [19]

Rogers

[11] 4,247,075
[45] Jan. 27, 1981

[54] MOLDS FOR MAKING FEATHERED LURES

[76] Inventor: Walter J. Rogers, 2803 Homedale Rd., Klamath Falls, Oreg. 97601

[21] Appl. No.: 87,249

[22] Filed: Oct. 22, 1979

Related U.S. Application Data

[60] Continuation-in-part of Ser. No. 965,320, Dec. 1, 2978, abandoned, which is a division of Ser. No. 882,131, Feb. 28, 1978, Pat. No. 4,149,334, which is a continuation of Ser. No. 671,046, Mar. 29, 1976, abandoned.

[51] Int. Cl.³ .................................................. B29C 6/00
[52] U.S. Cl. ............................... 249/95; 425/DIG. 34; 425/116; 425/129 R
[58] Field of Search ............... 425/110, 116, 117, 123, 425/127, 128, 129 R, DIG. 34; 249/83, 95, 96, 97; 43/42.24

[56] References Cited

U.S. PATENT DOCUMENTS

| 2,643,418 | 6/1953 | Auldridge | 249/95 X |
| 2,999,276 | 9/1961 | Morin | 425/129 X |
| 3,191,336 | 6/1965 | Cordell | 43/42.24 |
| 3,374,503 | 3/1968 | Boniger | 425/129 |
| 3,387,076 | 6/1968 | Murooka | 425/116 X |
| 3,453,706 | 7/1969 | Kamen | 249/97 X |
| 3,555,274 | 11/1967 | Patriache et al. | 425/123 X |

Primary Examiner—J. Howard Flint, Jr.
Attorney, Agent, or Firm—Klarquist, Sparkman, Campbell, Leigh, Hall & Whinston

[57] ABSTRACT

Barbules are positioned on a shank of a hook and a channel-like lure body having a rounded tip is molded onto the hook with a central rib embedding the barbules to attach them to the hook in positions extending outwardly and upwardly beyond the edges of the body. In an alternate embodiment, a mold has a spacing rib extending along a groove to hold a quill away from the wall of the groove.

1 Claim, 16 Drawing Figures

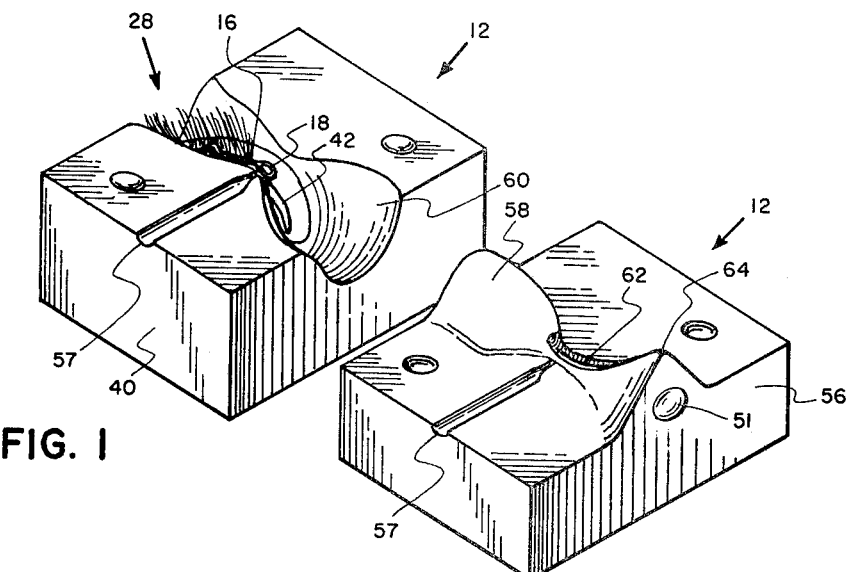
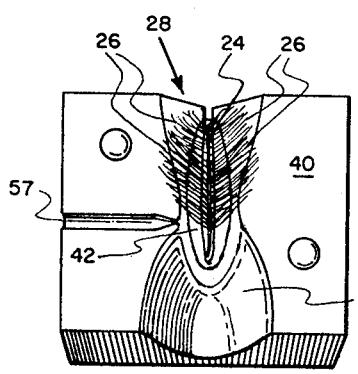
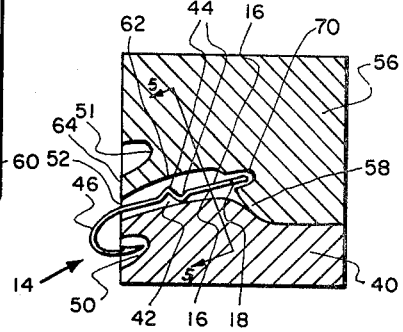
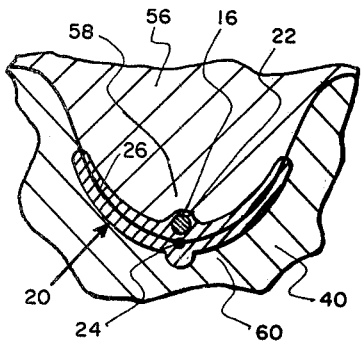
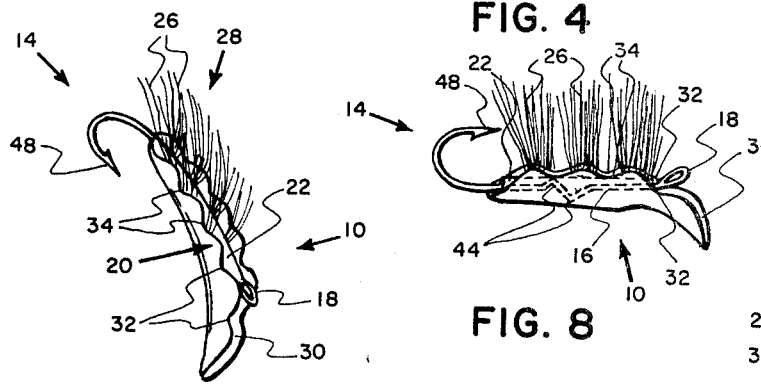

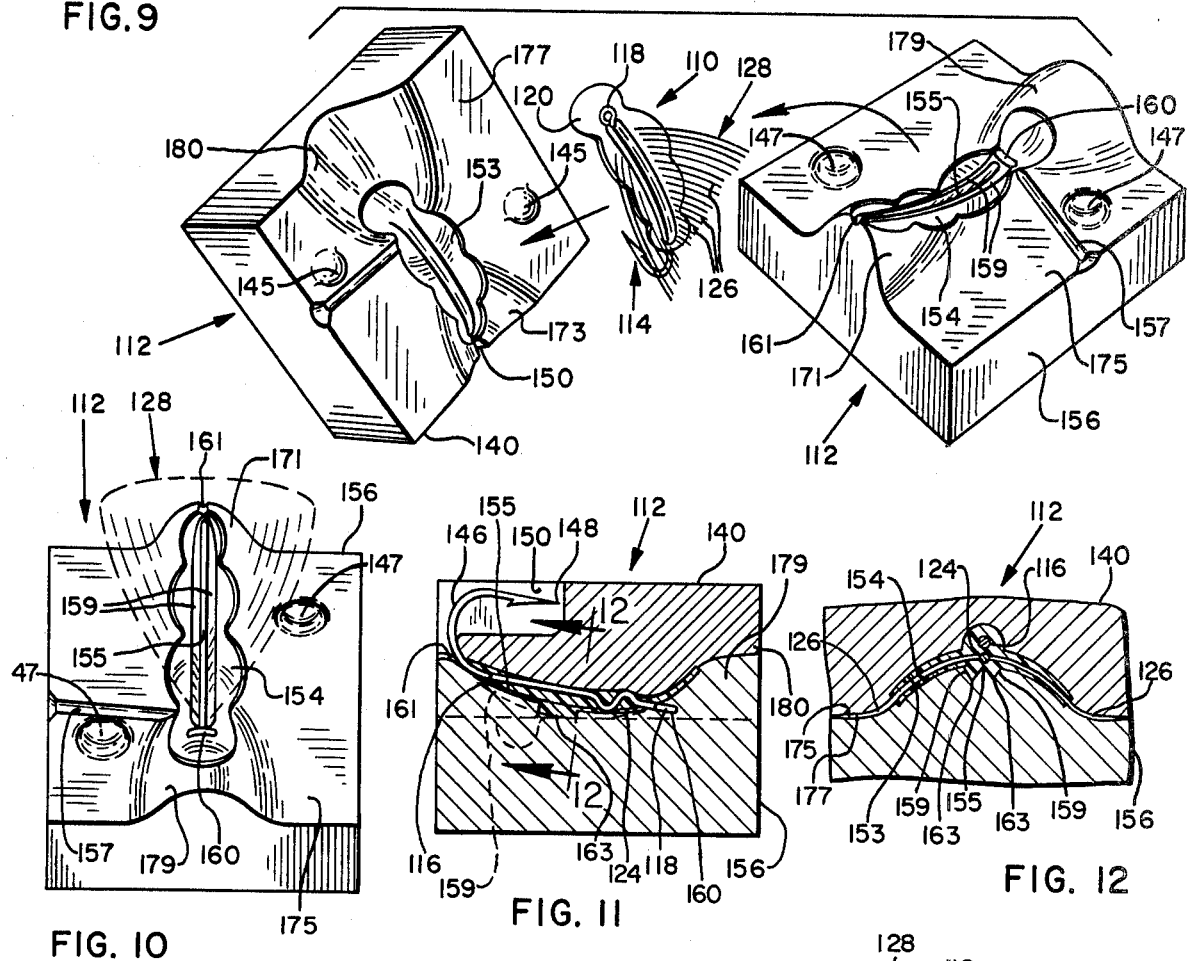

MOLDS FOR MAKING FEATHERED LURES

This is a continuation-in-part of Ser. No. 965,320, filed Dec. 1, 1978 (abandoned), which is a division of application Ser. No. 882,131, filed Feb. 28, 1978, now U.S. Pat. No. 4,149,334, which is a continuation of application Ser. No. 671,046, filed Mar. 29, 1976 (abandoned).

DESCRIPTION

This invention relates to feathered lures and has for an object thereof the provision of feathered lures and an apparatus for making the same.

Another object of the invention is to provide an apparatus for securing barbules to a lure.

Another object of the invention is to provide an apparatus for molding a body on a shank of a hook and embedding butt portions of barbules in the body in positions extending outwardly and upwardly relative to the body.

Another object of the invention is to provide a mold having spacing means adapted to hold barbules away from an adjacent wall of a mold cavity so that material is molded over the barbules.

In the drawings:

FIG. 1 is a perspective view of a lower section of a mold forming one embodiment of the invention with a hook and a feather positioned therein;

FIG. 2 is an inverted, perspective view of an upper section of the mold of FIG. 1;

FIG. 3 is an enlarged, fragmentary, perspective view of the lower section of the mold;

FIG. 4 is a longitudinal sectional view of the mold;

FIG. 5 is an enlarged, transverse sectional view on line 5—5 of FIG. 4;

FIG. 6 is a perspective view of a feathered lure forming one embodiment of the invention;

FIG. 7 is an enlarged, transverse sectional view of the feathered lure of FIG. 6;

FIG. 8 is a slightly tilted side elevation view of a feathered lure forming an alternate embodiment of the invention;

FIG. 9 is an exploded perspective view of a feathered lure and a mold forming an alternate embodiment of the invention;

FIG. 10 is a perspective view of a section of the mold of FIG. 9;

FIG. 11 is a longitudinal section of the mold of FIG. 9;

FIG. 12 is a transverse section of the mold of FIG. 9 taken along line 12—12 of FIG. 11;

FIG. 13 is a side elevation of a hook of the lure of FIG. 9;

FIG. 14 is a side elevation view of the lure of FIG. 9;

FIG. 15 is a bottom plan view of the lure of FIG. 15; and

FIG. 16 is a top plan view of the lure of FIG. 9.

Referring now in detail to the drawings, there is shown therein a feathered lure 10 which can be made in a mold 12 forming one embodiment of the invention. The lure 10 includes a hook 14 having a shank 16 and an eye 18. An upwardly concave or channel-like body 20 of a flexible, tough, durable, injection molded plastic material is molded onto the shank. The plastic material may be a vinyl, polypropylene, polyethylene or a polyester, for example, molded onto the shank. The body has an upper, central rib 22 embedding a quill 24 and butt portions of barbules 26 of a feather section 28. The feather section may be duck, pheasant, gamecock, neck hackle, or natural or imitation hair, for example. The rib rigidly secures the feather section to the body in positions in which the barbules are flared outwardly and upwardly, the feather section being "stripped" when the body and rib are molded, that is, the barbules are spread out to extend somewhat near right angles to the quill. Preferably, at least half of the length of each barbule is beyond the side edge of the body. The hackles keep the body upright and give it action, and may be of fur or other type of hackle. The body also has, in front of the eye, a downwardly and forwardly extending lip portion 30, provided with notches 32 at its forward lip portion to make it quite rounded. The body also has rounded notches 34 just behind the eye. The body may be designated spoon-like in a broad sense of the term.

To form the feathered lure 10, the hook 14 is placed in a lower female mold section 40 of the mold 12 with the shank 16 lying in a groove 42, undulations 44 substantially centering the shank in the groove. A bend 46 of the hook is positioned beyond the lower mold section and a point 48 of the hook, if downturned, extends into a slot 50 in the lower mold section, or, if upturned, into a slot 51, a narrow portion 52 of the groove fitting closely on the beginning portion of the bend. The feather section 28 then is placed in body cavity 54 of the mold and on top of the shank. An upper, male, mold section 56 then is placed on the lower mold section to cover the cavity 54 and press the outer end portions of the stripped barbules against the lower mold section, the eye of the hook entering a hole in the upper mold section. This clamps the barbules in their upwardly and outwardly flared positions. Then, after clamping the mold sections together, plastic material is injected into the mold cavity through injection passage 57 to fill the mold cavity.

The upper mold section has a rounded protuberance 58 complementary to and fitting into concave portion 60 of the lower mold section. After the plastic material has been injected into and fills the cavity, it cools and hardens, and the mold sections then are separated and the feathered lure is removed from the mold. The upper mold section has a groove 62 which forms the rib 22 and a narrow groove portion 64 fitting closely on the beginning portion of the bend of the hook. The average length of the top portions of the barbules that extend beyond the side edges of the body is preferably from one-third to two-thirds of the length of the body, and the free portions of the barbules (the portions extending upwardly and outwardly from the rib) preferably are at an angle of at least 45° to the rib. The feathers may, of course, be of any desired color, and the color of the body may be varied as desired and have any desired pattern of contrasting colors. Preferably, the feathers are of the stiff hackle type.

EMBODIMENT OF FIG. 8

A feathered lure forming an alternate embodiment of the invention and shown in FIG. 8 is like that of FIGS. 6 and 7 except that a hook 14 thereof is upturned rather than down-turned. The lure of FIG. 8 includes a body 20 having a central rib embedding a feather quill (not shown) like the quill 24. The hook has a shank 16 and an eye 18 and undulations 44. The body is like the body 20 of FIGS. 6 and 7, and has a lip portion 30 with notches 32 to make the lip portion rounded and notches 34.

EMBODIMENT OF FIGS. 9–16

A mold 112 forming an alternate embodiment of the invention includes mold sections 140 and 156 like the mold sections 40 and 56, respectively, except that the mold section 156 has a spacing rib or bead 155 paralleling and separating grooves 159 extending from a socket 160 closely receiving an eye 118 of a hook 114 to an end groove 161 at the end of the bead 155. The groove 161 closely receives and positions bend 146 of the hook near shank 116 of the hook. One of keying undulations 144 of the hook engages a quill 124 of a feather section 128 and holds the quill against the spacing rib 155. This holds the quill and butt portions of barbules 126 of the feather away from the walls of the grooves 159 during molding so that covering ribs 163 of plastic molding material forming a sheet-like body 120 of lure 110 cover the quill and butt portions of the barbules. In effect, the spacing rib 155 causes the quill and the butt portions of the barbules to be embedded under or covered by the covering ribs 163 of the body. The mold section 140 has a clearance slot 150 for receiving the bend 146 and point 148 of the hook. The mold sections have body cavities 153 and 154 which form the sheet-like body of the lure, and an injection passage 157 is provided to permit plastic material such as, for example, ethylene vinyl acetate to be injected into the mold cavity. Opposed, complementary boss portion 171 and recess portion 173 of the mold sections 140 and 156 press against the portions of the barbules extending out of the mold cavity and planar surfaces 175 and 177 of the mold sections are held in abutting relationship during the molding. The mold sections are clamped together during the molding operation, rounded pins 145 and sockets 147 being provided for alignment. Also, complementary boss portion 179 and recess portion 180 of the mold sections abut each other during the molding. These and the portions 171 and 173 precisely locate the two mold sections when the latter are clamped together.

In explaining in more detail about each of these finished lures, the body is curved and upwardly concave with upwardly and outwardly flared wings of feather, fur or hackle. The curved concave body of the lure when fished or worked through the water, cast or trolled, produces a fast wriggling motion, and the upward and outward flared wing design of the molded feather has a stabilizing effect on the lure, keeping the top side of the lure up at all times while being fished, cast, trolled, fast or slow speed. The lure is durable, possess a unique design that promotes good looks and an unusual fish catching action.

I claim:
1. In a mold for making a feathered lure,
a female mold section having a surface forming a sheet-like body cavity for receiving moldable material including a shank of a hook and a quill and the butt portions of barbules of a feather, and
a male mold section having a surface adapted to close the cavity and cover the shank and the butt portions of the barbules,
one of the mold sections having a groove portion in its surface and for forming part of said cavity, said groove portion loosely receiving the quill and the shank of the hook,
the mold sections having portions outside the body cavity serving to receive the barbules and press against the barbules from opposite sides to hold the barbules in upwardly and outwardly extending positions,
the mold sections holding the hook in a position in which the shank of the hook holds the quill in the groove portion,
said one of the mold sections having a spacing rib extending along the length of the groove portion to hold the quill in a position spaced from the bottom of the groove portion, whereby material is molded into a pair of beads over the butt portions of the barbules adjacent the quill, the rib maintaining the feather in position in the groove portion against the pressure of the moldable material when the material is injected into the cavity.

* * * * *